United States Patent
Miller et al.

(10) Patent No.: US 10,248,474 B2
(45) Date of Patent: Apr. 2, 2019

(54) APPLICATION EVENT DISTRIBUTION SYSTEM

(71) Applicant: Microsoft Technology Licensing, LLC, Redmond, WA (US)

(72) Inventors: Michael Alyn Miller, Redlands, CA (US); Doug Beck, Bothell, WA (US); Emily Price, Seattle, WA (US); Carlos Carvallo, Sammamish, WA (US); Tim Gill, Kenmore, WA (US); Chad Gibson, Seattle, WA (US); William Michael Zintel, Woodinville, WA (US); Dave Reed, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 14/167,769

(22) Filed: Jan. 29, 2014

(65) Prior Publication Data

US 2015/0212811 A1    Jul. 30, 2015

(51) Int. Cl.
| | |
|---|---|
| *G06F 8/20* | (2018.01) |
| *G06F 8/71* | (2018.01) |
| *G06F 9/54* | (2006.01) |
| *G07F 17/32* | (2006.01) |

(52) U.S. Cl.
CPC ............ *G06F 9/542* (2013.01); *G06F 8/20* (2013.01); *G06F 8/71* (2013.01); *G07F 17/323* (2013.01); *G07F 17/3225* (2013.01); *G07F 17/3232* (2013.01)

(58) Field of Classification Search
CPC ...... G06F 8/20; G06F 8/40; G06F 8/60–8/71; G06F 9/542

USPC .......... 717/120, 136, 137, 168–178; 719/318
See application file for complete search history.

(56) References Cited

U.S. PATENT DOCUMENTS

| | | | |
|---|---|---|---|
| 6,709,331 B2 | 3/2004 | Berman | |
| 7,207,564 B2 | 4/2007 | Bedford et al. | |
| 7,240,063 B2 * | 7/2007 | Aoyama | |
| 7,392,505 B2 * | 6/2008 | Ciapala et al. | 717/106 |
| 7,398,530 B1 * | 7/2008 | Parla | G06F 9/542 |
| | | | 714/2 |
| 7,668,908 B2 * | 2/2010 | Kakivaya et al. | 709/204 |
| 7,840,970 B2 * | 11/2010 | Liang | G06F 9/4443 |
| | | | 717/124 |

(Continued)

OTHER PUBLICATIONS

Salvucci, S., et al., A Practical Approach for Enabling Online Analysis of Event Streams, Proceedings of the 2007 inaugural international conference on Distributed event-based systems, 2007, pp. 158-163, [retrieved on Nov. 13, 2018], Retrieved from the Internet: <URL:http://dl.acm.org/>.*

(Continued)

*Primary Examiner* — Geoffrey R St Leger
(74) *Attorney, Agent, or Firm* — Arent Fox LLP

(57) ABSTRACT

A system for transforming events from discrete events into aggregated values and statistics and for routing events and aggregated values to consuming clients and servers is provided. Events are described in a common syntax amongst different applications accessing the system. Events are routed between the transformation system and other clients and servers. Secondary application developers can provide new functionality using the event and statistic stream even after the primary application developer has already shipped to the consumer.

10 Claims, 12 Drawing Sheets

(56) References Cited

U.S. PATENT DOCUMENTS

| | | | |
|---|---|---|---|
| 7,895,605 B2* | 2/2011 | Goswami | G06F 11/3476 |
| | | | 714/48 |
| 8,065,685 B2* | 11/2011 | Cermak | G06F 17/2247 |
| | | | 715/236 |
| 8,147,327 B2 | 4/2012 | Trang | |
| 8,561,028 B1* | 10/2013 | Zuckerman | G06F 11/3636 |
| | | | 717/124 |
| 8,672,751 B2* | 3/2014 | Leen et al. | 463/29 |
| 8,784,217 B2* | 7/2014 | Gavish | G06F 9/542 |
| | | | 463/31 |
| 9,239,743 B2* | 1/2016 | Gupta | G06F 11/0766 |
| 9,256,482 B2* | 2/2016 | Boger | G06F 9/542 |
| 9,798,529 B2* | 10/2017 | Traversat | G06F 21/121 |
| 2003/0045358 A1* | 3/2003 | Leen et al. | 463/42 |
| 2003/0144849 A1* | 7/2003 | Kakivaya et al. | 705/1 |
| 2003/0149958 A1* | 8/2003 | Baluja | G06F 8/31 |
| | | | 717/106 |
| 2005/0080755 A1* | 4/2005 | Aoyama | 707/1 |
| 2005/0091373 A1* | 4/2005 | Ciapala et al. | 709/224 |
| 2005/0251797 A1* | 11/2005 | Omiya | G06F 8/70 |
| | | | 717/165 |
| 2006/0136933 A1* | 6/2006 | Jensen | G06F 9/542 |
| | | | 719/318 |
| 2008/0120628 A1* | 5/2008 | Liang | G06F 9/4443 |
| | | | 719/328 |
| 2008/0134214 A1* | 6/2008 | Goswami | G06F 11/3476 |
| | | | 719/318 |
| 2009/0070786 A1* | 3/2009 | Alves | G06F 9/541 |
| | | | 719/318 |
| 2009/0106775 A1* | 4/2009 | Cermak | G06F 17/2247 |
| | | | 719/318 |
| 2010/0317426 A1 | 12/2010 | Bond et al. | |
| 2012/0072905 A1* | 3/2012 | Traversat | G06F 21/121 |
| | | | 717/177 |
| 2012/0124584 A1* | 5/2012 | Addala | G06F 9/542 |
| | | | 718/102 |
| 2012/0278817 A1* | 11/2012 | Oliver | G06F 9/4843 |
| | | | 719/318 |
| 2012/0329549 A1 | 12/2012 | Johnson | |
| 2013/0065691 A1* | 3/2013 | Gavish | G06F 9/542 |
| | | | 463/40 |
| 2013/0067024 A1* | 3/2013 | Vasters | G06F 9/542 |
| | | | 709/217 |
| 2014/0109111 A1* | 4/2014 | Gupta | G06F 11/0766 |
| | | | 719/318 |
| 2015/0058676 A1* | 2/2015 | Boger | G06F 11/30 |
| | | | 714/39 |

OTHER PUBLICATIONS

Meier, R., State of the Art Review of Distributed Event Models, Technical Report, Department of Computer Science, University of Dublin, Trinity College, Mar. 2000, 64 pages, [retrieved on Nov. 13, 2018], Retrieved from the Internet: <URL:https://scss.tcd.ie/publications/tech-reports/reports.00/TCD-CS-2000-16.pdf>.*

* cited by examiner

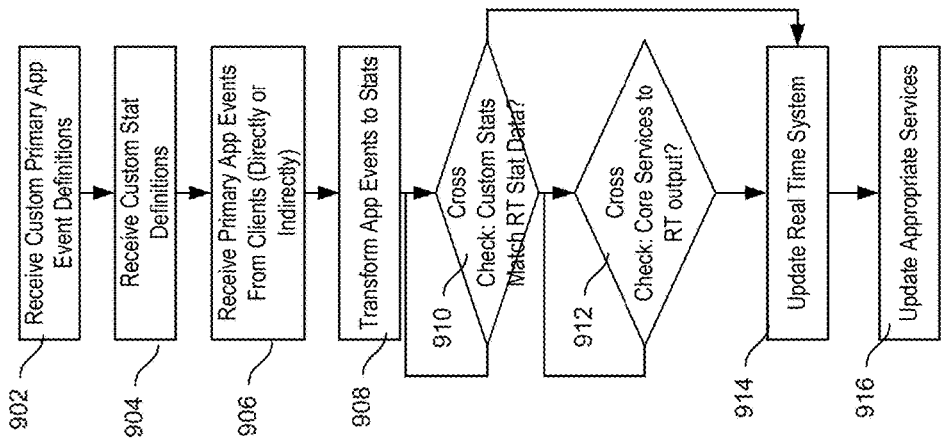
FIG. 9
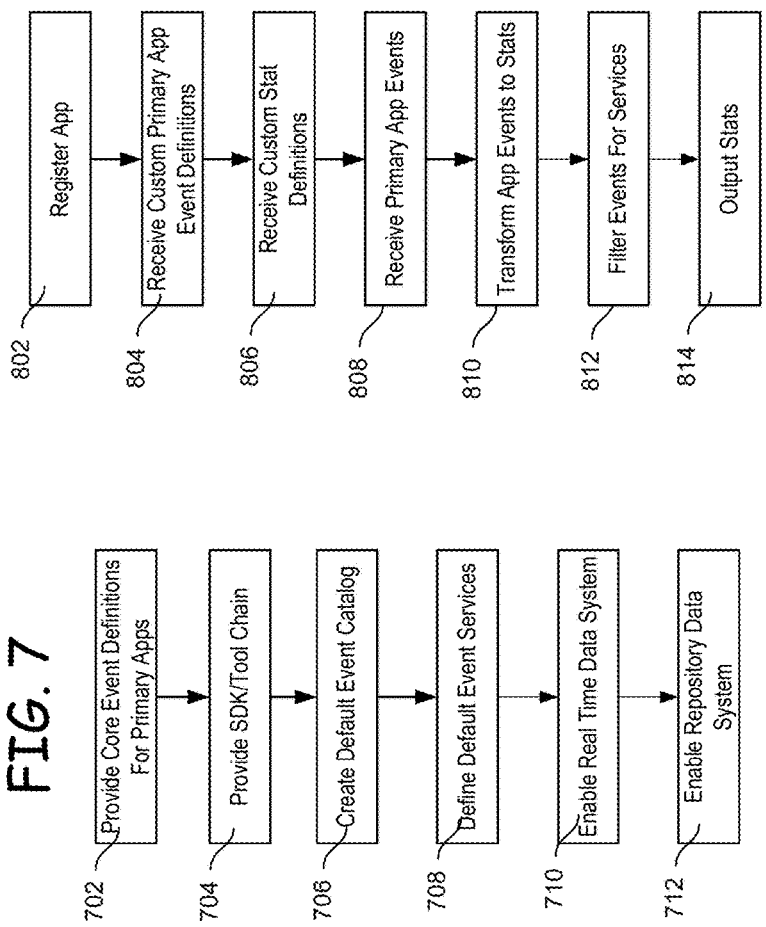
FIG. 8
FIG. 7

APPLICATION EVENT DISTRIBUTION SYSTEM

BACKGROUND

Various types of applications benefit from development by third parties adding functionality to the original application product. Applications are generally no longer defined by the features only in the developed product. One example of such applications are games operated on consoles, with companion or "secondary" applications operated on smart phones or tablets. Halo Waypoint is one such example of a smartphone application that interacts with the Halo game software on a different processing device—for example any of the Xbox systems—to provide experiences beyond the core Halo gameplay.

One challenge with implementing secondary application is that functionality for the secondary product is usually specially defined in the primary application during the development. This limits flexibility for secondary developers to provide additional functionality after launch of the primary product. In addition, only those scenarios provided by the developer of the host product are supported. Finally, the developers of the host product may want an easier way to add functionality to their own product in a way that does not require this extra functionality to be tightly coupled to—or even specifically supported by—the host product itself.

SUMMARY

Technology is presented which provides primary application developers, such as game developers, with the ability to publish events and values to other application developers in real time who can use this information to supplement the primary application experience. The technology includes a language for describing events for a wide variety of applications. A system for transforming events from discrete events into aggregated values and statistics, and for routing events and aggregated values to consuming clients and servers, is provided. In addition, a system for routing events and aggregated values between the transformation system and other clients and servers is provided.

In one context, a method in accordance with the technology includes providing a data syntax allowing primary application developers to encode events generated by different primary application developers in a common format. The method further includes operating a data service on a processing device. The data service receives a plurality of events in the data syntax from a plurality of different applications operating on different processing devices. The events are transformed by the service into values related to one or more characteristics of primary applications and provided to output services allowing secondary application developers to receive the original events, the transformed values, service-generated derivatives of one or the other, or all of the above.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 illustrates a method performed by an application service provider.

FIG. 8 illustrates a method performed to distribute realtime events in accordance with the present technology by an application service provider.

FIG. 9 is a flowchart illustrating a method performed by the application service provider to provide a repository data system.

DETAILED DESCRIPTION

Technology is presented which provides primary application developers with the ability to publish data in the form of events and values from a multitude of games or applications executing on user devices to secondary application developers who may wish to supplement the primary application experience in real time. Optionally, the technology includes a language for describing events for a wide variety of applications. A system for transforming events from discrete events into aggregated values and statistics, and for routing events and aggregated values to consuming clients and servers, is provided. In addition, a system for routing events and aggregated values between the transformation system and other clients and servers is provided. This technology allows the event producers and consumers to be decoupled, and makes it possible for new functionality to be created using the event and statistic stream even after the primary application has already shipped to the user.

The technology presented herein enables companion or "secondary" applications to be created to supplement a user experience with "primary" applications. In some embodiments, no interaction between the developer of the secondary application and the primary application may occur. Primary application developers may make events and statistics available for their applications, in a manner which allows secondary developers to create additional experiences without a need to specifically provide for specific secondary applications. Both primary and secondary application developers have the freedom to create and modify their applications independent of each other.

Figure 1:
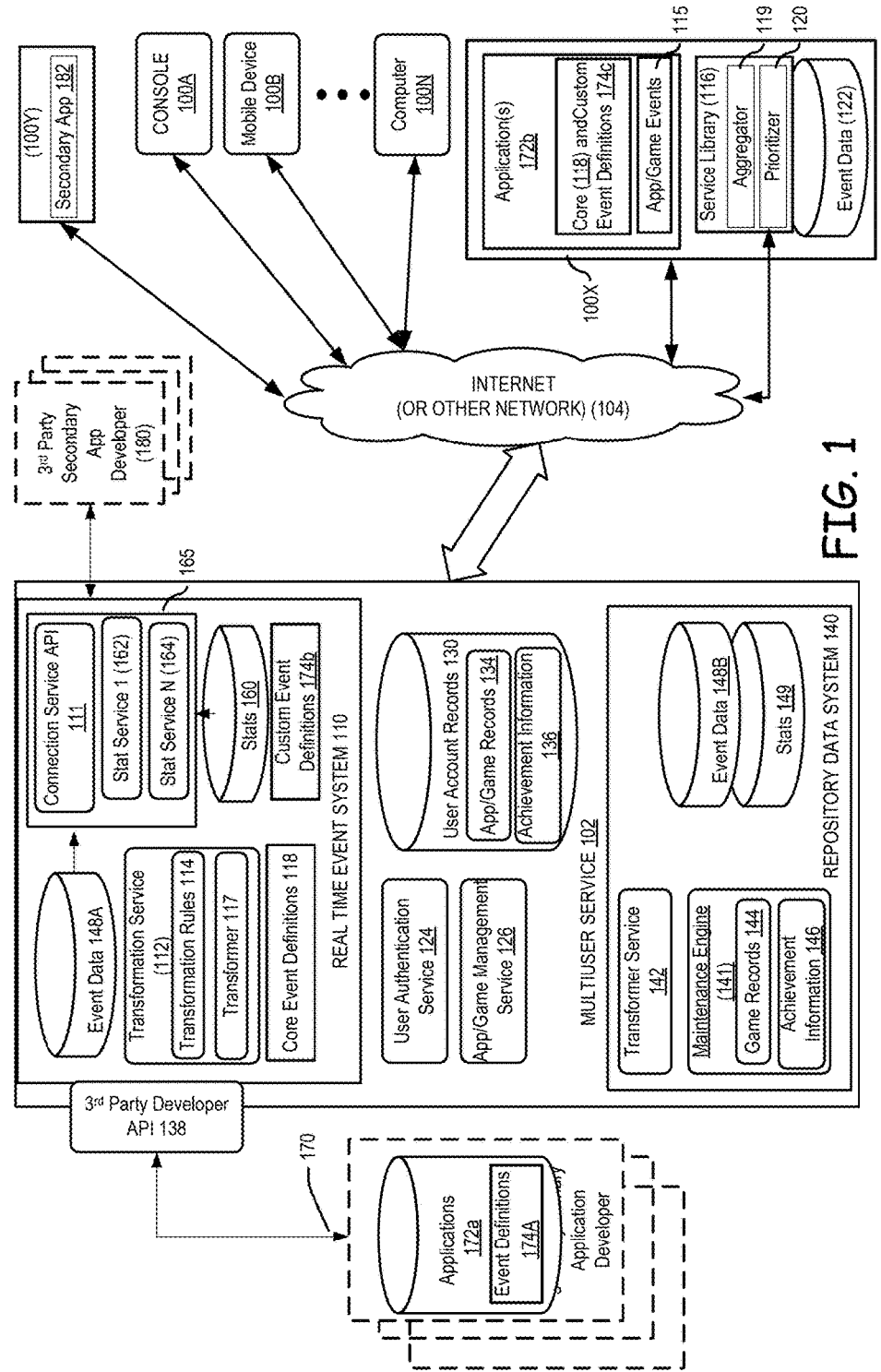
FIG. 1 depicts a block diagram for implementing the present technology.

FIG. 1 illustrates an embodiment of a system for implementing the present technology. In the context of this description, the system of FIG. 1 will be described as a multiuser service. The technology is useful in, for example, a multiuser service such as the Xbox LIVE service available from Microsoft Corporation. It should be recognized that the applications for which the technology described herein may be utilized need not be gaming applications. Any type of applications which can be developed by a primary application developer, and for which supplemental application developers would desire to develop secondary applications, can benefit from the technology described herein. For example, productivity applications such as Microsoft Word® or Excel® may stream own events or values which secondary developers could then use to implement secondary experiences for those applications.

FIG. 1 illustrates a multiuser service 102 which is coupled via a network 104 to one or more processing devices 100 (including devices 100A, 100B, 100N, 100X, 100Y). Processing devices 100 may communicate with service 102 using network 104. Network 104 may be a public network, a private network, or a combination of public and private networks such as the Internet. Each of the processing devices 100A, 100B, 100N, 100X, and 100Y shown and described herein may comprise one or more of the processing devices illustrated in FIGS. 12 through 14 herein. These include, for example, a console 100A, a mobile device 1008, computer 100N, or a console 100X. While a limited number of processing devices 100 are illustrated, a large number of processing devices may be in communication with service 102 via network 104 at any time.

Multiuser service 102 includes a real time event system 110, a repository data system 140, a game management service 126, a user authentication service 124, an API 138, and user account records 130. Any number of third-party primary application developers 170 provide primary applications 172 which interact with a game management service 126 of multiuser service 102. Primary application 172 are generally executed on user processing devices 100A, 100B, 100C, 100X. When executing on a processing device 100, primary applications 172b (such as games) generate and output application events 115. In accordance with the technology, discrete or aggregated events 115 are transmitted to the multiuser service 102 and to secondary applications 182 executing on other processing devices, such as device 100Y. Examples of events are those which may occur in the context of a game. For example, in a racing game, top speed, average speed, wins, losses, placement, and the like are all events which may occur. In an action game, shots fired, scores, kills, weapons used, levels achieved, and the like, as well as other types of achievements, are all events that may occur.

In accordance with the technology, third party secondary application developers 180 can develop secondary applications 182 for use on processing devices 100Y to augment the experience provided by the third-party primary application developers 170. These secondary applications 182 consume events and/or statistics generated from events provided by the multiuser service 102.

In one embodiment, statistics are generated for events by the multiuser service. In addition, similar events generated on processing devices 100 may be aggregated prior to being sent to the multiuser service 102. Use of statistics and aggregation provides bandwidth savings for both the processing devices and the secondary applications. In another embodiment, discrete events are both transmitted from the processing devices 100 to the service 102 and used by secondary applications.

Figure 2A:
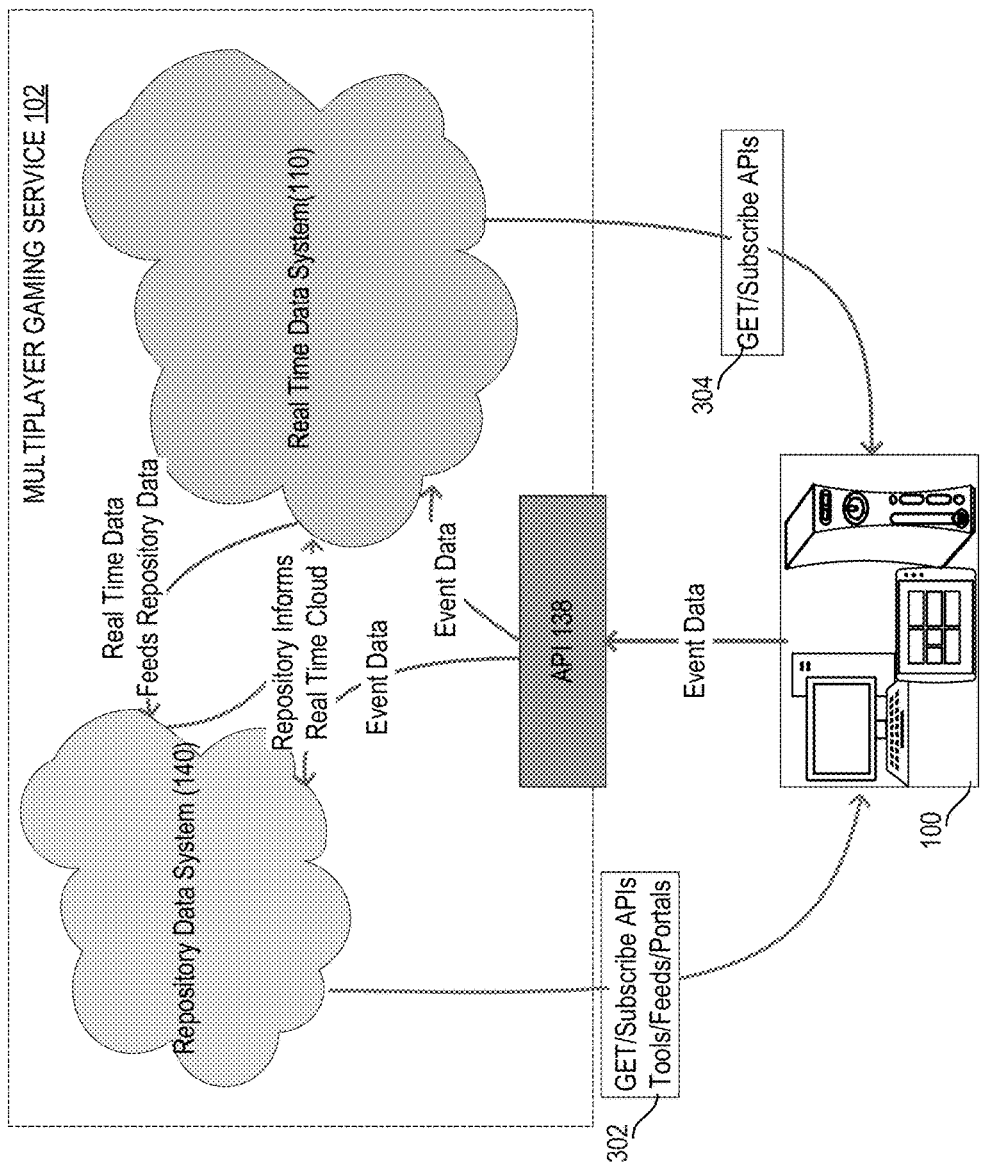
FIG. 2A is a block diagram illustrating data flow in accordance with the present technology.

With reference to FIG. 2A, data flow in the systems set forth in FIG. 1 is generally represented. Components of the multiuser service 102 including a repository data system 140 and real-time event system 110 as well as API 138 are illustrated along with event flow and dataflow between the systems. As event data is generated by primary applications processing devices 100, the events are collected by service 102 transmitted through the API to both the repository data system 140 and the real-time data system 110. This event data is transformed and maintained by the real-time data system 110 and the repository data system 140 in accordance with the discussion below. Through get/subscribe APIs 302 304, information is returned to the processing devices 100. Real-time data system 110 feeds repository data system 140 with event and statistic information created by the real-time data system 110 for use by the repository data system in tracking events and verifying the accuracy of information provided by the real time data system 110. The repository data system, in turn, updates the real-time data system 110 with any information which it deems to have been lost or needs correcting.

Returning to FIG. 1, multiuser service 102 includes a real time event system 110, a repository data system 140, a game management service 126, a user authentication service 124 and user account records 130. Multiuser service 102 may also include a third party application programming interface 138 which allows third party application developers 170 to provide and configure event definitions for applications 172 which are used in conjunction with the multiuser service 102. Various components of the applications may be run on the multiuser service 102 and/or processing devices 100. In one embodiment, third party gaming developers 170 having applications 172 may register the applications with the multiuser service 102 and allow certain components of the applications 172 to be managed by the game management service 126. In alternative embodiments, multiuser games may be administered and provided directly by third party developers 170, but utilize services of the multiuser service 102, such as the real time event system 110 and the repository data system 140. Third party developers 170 may provide one or more applications 172 to users of processing devices 100A, 100B, 100N, 100X. Game management services 126 can provide updates on user sessions, including where game play lobbies and rooms of users gather for multiuser game connections, various episodes, and games including episodic content, various gaming channels, (rooms for basic, intermediate, and advanced players), and the like. User account records 130 may include game records 134 and records of the user's career progression or achievement information 136.

Although one block illustrating a third party primary application developer 170 is illustrated in FIG. 1, it should be understood that a number of different third-party primary application developers 170 will utilize the multiuser service 102. Likewise, although one third-party secondary application developer 180 is illustrated, any number of different secondary application developers 180, will utilize the multiuser service 102.

Multiuser service 102 may also include a user authentication service 124, wherein each user on one or more of the processing devices 100A, 100B, 100N, 100X has associated therewith a unique user identifier, such as a gamer tag, which is used to uniquely identify the user within the multiuser service 102. When a user seeks to play or interact with one of the applications 172a with other users on other processing devices, connection by and/or between the users is controlled by first requiring each of the users to authenticate themselves to the multiuser service 102 via the user authentication service 124. The service 102 allows different users on different processing devices to participate in activities resident on those devices with other users, and maintains connections between the users. An exemplary service 102 is Microsoft's X-Box Live™ service provided by Microsoft Corporation, Redmond, Wash.

Console 100X illustrates functional components of applications and activities which may be occurring on any one or more of the devices 100A, 100B, 100N, 100X. Console 100X may include a number of game applications 172a executed by the processing device of the console 100X. Processing device 100X includes one or more game applications 172b, each of which outputting game events 115 which result from the running of the game and the user's participation in the game. Each game application may be equipped with custom event definitions 174c (all or a portion of the events 174a), defined by the developer of the primary game application 172a, 172b, as an event which the developer wishes to expose to secondary application developers 180. One or more standard or core game events may be defined by an administrator of the multiuser service 102 and exposed to application developers 180.

In one embodiment, a service library 116 includes an aggregator 119 and prioritizer 120. The service library communicates with the game application to transmit game events 115 via network 104 to the multiuser service 102. Event data 122 may be stored on each processing device 100X. Service library 116 can perform local aggregation of events as well as prioritize which events are transmitted to the multiuser service 102 while the game application running, or when the processing device 100X is unable to communicate with service 102. It should be understood that use of a service library 116 is optional, and in another embodiment discrete game events 115 may be transmitted directly to the multiuser service 102, or aggregation and prioritization may be included in applications by application developers 170.

The real-time event system 110 and repository data system 140 of the multiuser service 102 provide a mechanism to allow secondary developers to utilize real-time and archived game information supplied by users executing processing devices 100 and secondary applications which can augment the game applications (172a, 172b) provided by third party primary application developers 170.

Real-time event system 110 provides real-time game information in the form of events and statistics to the secondary application developers 180, as well as the repository data system 140. Real-time event system 110 receives event data from a plurality of running primary applications 172b on any of the processing devices 100A, 100B, 100N, 100X and transforms this events into data which is useful for secondary application developers 180. Real-time event system 110 includes event data 148a, a transformation service 112 including transformation rules 114 and transformer 117, core event definitions 118, a statistics data store 160, custom event definitions 174b, and a connection service 165. The connection service 165 includes a connection service API 111, and any number of statistical output services 162, 164. The statistics services may be provided by the service and provide different types of statistics and information to the third party application developers 180. One example is a trending data service, indicating what primary games are popular with users of the multiuser service 102. Another example is a leaderboard service for achievements within the service 102 or individual games.

The real time event system 110 ensures discrete raw events and transformed statistics are made available to secondary applications and reporting systems such as services 162, 164. This availability could take many forms: a historical record of every event was triggered, a database of every transformation that has taken place, a snapshot of each user's current values, real-time delivery of events from the host application to other applications, real-time delivery of values as they are calculated by the transformation engine, and the like.

Event data 148a includes event data transmitted from event database 122 on one of the processing devices 100. The event data is provided to the transformation service 112 which uses the transformation rules 114 to output statistics into the statistics datastore 160. Transformation rules are defined by an administrator of the service 102 and/or primary application developers 170 and/or secondary application developers 180. The real-time event system 110 receives custom event definitions 174a, 174b from third-party primary application developers 170. Custom event definitions 174a, 174b include a variety of event definitions, such as those provided in event definitions for applications 172a, from any number of different third-party primary application developers 170.

As illustrated above with respect to FIG. 2, as game applications 172b are executed on processing devices 100, game events 115 are generated and transmitted to the real-time event system 110 via network 104. Real-time event system 110 transforms events and statistics for use by secondary application developers 180. Primary application developers 170 can define custom event definitions 174a, 174b for particular types of events they wish to expose to secondary application developers 180. In some embodiments, multiuser service 102 may enable a core set of core event definitions 118 for services that multiuser service 102 provides to secondary application developers 180. Such core event definitions allow service 102 to provide a base set of services to users of the service. One example of such a base service may include leaderboard and achievement services which may be incorporated into the game management service 126. Transformation service 112 transforms event data into statistics using transformation rules 114 which may be customized by either an administrator of the multiuser game service 102 or third-party primary application developers 170. In other embodiments, secondary application developers 180 may be allowed to access to the real-time event system and likewise define transformation rules 114.

The repository data system 140 tracks all events 115 in a second datastore 148b. The repository data system 140 acts as a backup and crosscheck to the real-time event system 110. Transformer service 142 can perform the same types of transformations as service 112 provided on the real-time event system against the event data 140b stored in the repository data system 140 datastore 148b. The maintenance engine 141 including game records and achievement information can be used to crosscheck services provided by the game management service to ensure that, for example, achievements or other rewards which are tracked by the game management service, or statistics which have been provided to third-party secondary application developers 180, are not lost. In addition, the repository data system provides storage for tracking the aggregated values over time. Different stores could be used for different time windows, user actions, and the like. For example, one store could hold all of the user's values for all time, whereas another store might track the user's values for the current weekend. The latter could be used to incentivize the user to complete a challenge over a specific period of time (such as, for a racing game, "complete a race on this track in less than a specific lap time during this challenge weekend").

While the multiuser service 102 including the real-time event system 110 and repository data system 140 are all illustrated in single block, it should be understood that each of these systems may be implemented collectively or separately on a single processing device or a plurality of processing devices.

Figure 2B:
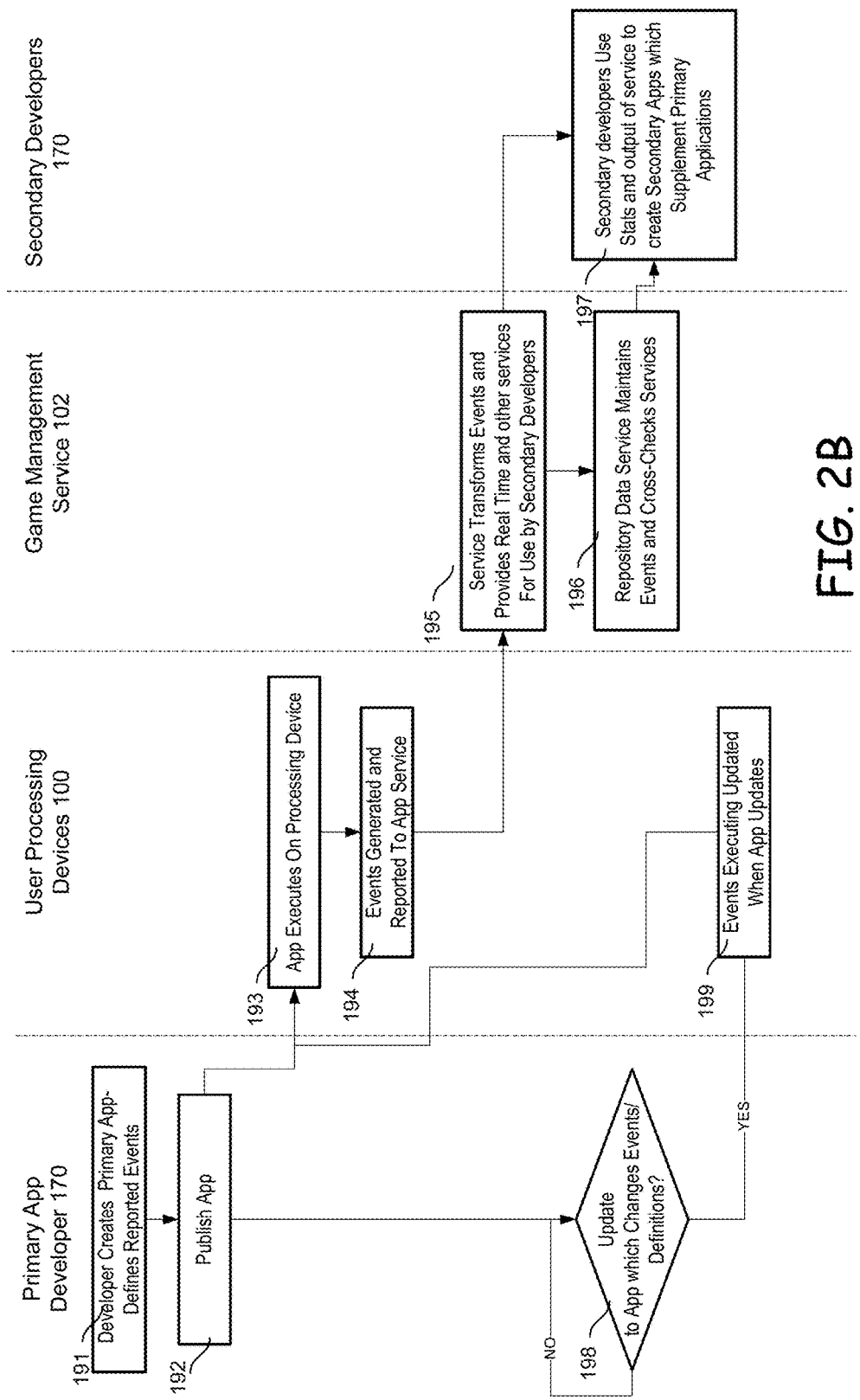
FIG. 2B depicts a flowchart of a method in accordance with the present technology.

FIG. 2B is a flowchart illustrating an overview of the operation of the systems and participants illustrated in FIG. 1. Illustrated in FIG. 2B are the actions of the primary application developer 170, the user processing devices 100, the game management service 102 and secondary developer 180. As illustrated in FIG. 2B at 191, a primary application developer will create a primary application and define which events from the application are to be reported to the multiuser service 102.

In accordance with the technology, an event definition language is provided for multiuser service 192 to allow standardized format for defining events. This allows application developers 170 to define events for the primary application. In accordance with the technology, this definition of events is the component where primary developer input is used to enable the technology for primary applications. Events are defined and/or produced from the primary application and generally such events are defined by the primary application developer. In some cases an event could be triggered as the result of interacting with a system-level resource. For example, a developer might use the system's matchmaking APIs to start a new multiuser session; those APIs could automatically trigger common events without requiring any effort on the part of the application developer.

After development, the primary application developer will publish the game at 192. Applications will be consumed by users and executed on user processing devices 193. As a result of execution at 193 events will be generated and reported to the multiuser service 102 at 194. At the multiuser service 102, the service will transform events and provide real-time output of events and other statistics for use by secondary developers at 195. In addition at 196, the repository data service will maintain a catalog of all the events received by the game management service 102 for use in maintaining accurate records of events, statistics and achievements performed on the user processing devices. At 197, secondary developers will use the events, statistics, and services output from the multiuser service to create secondary applications with supplement the primary game applications. At a subsequent point in time, primary developers may update the primary application at 198. Event-to-value transformation rules could be defined during the development of the application or well after the primary application has shipped to customers. New routings could be established as new scenarios are defined. The original application does not need to be aware of these extra features—events that were previously uninteresting and whose data was ignored could later become interesting and be consumed by secondary developers without any changes or modifications having been made to the host application. Such updates are incorporated into the multiuser service after the game is published to user processing devices at 199. Thus the developer may add or update any definitions of events developer wishes to expose. In addition, the developer can update or add transformation rules where developer updating of transforms is supported in an embodiment of the technology.

Figure 3:
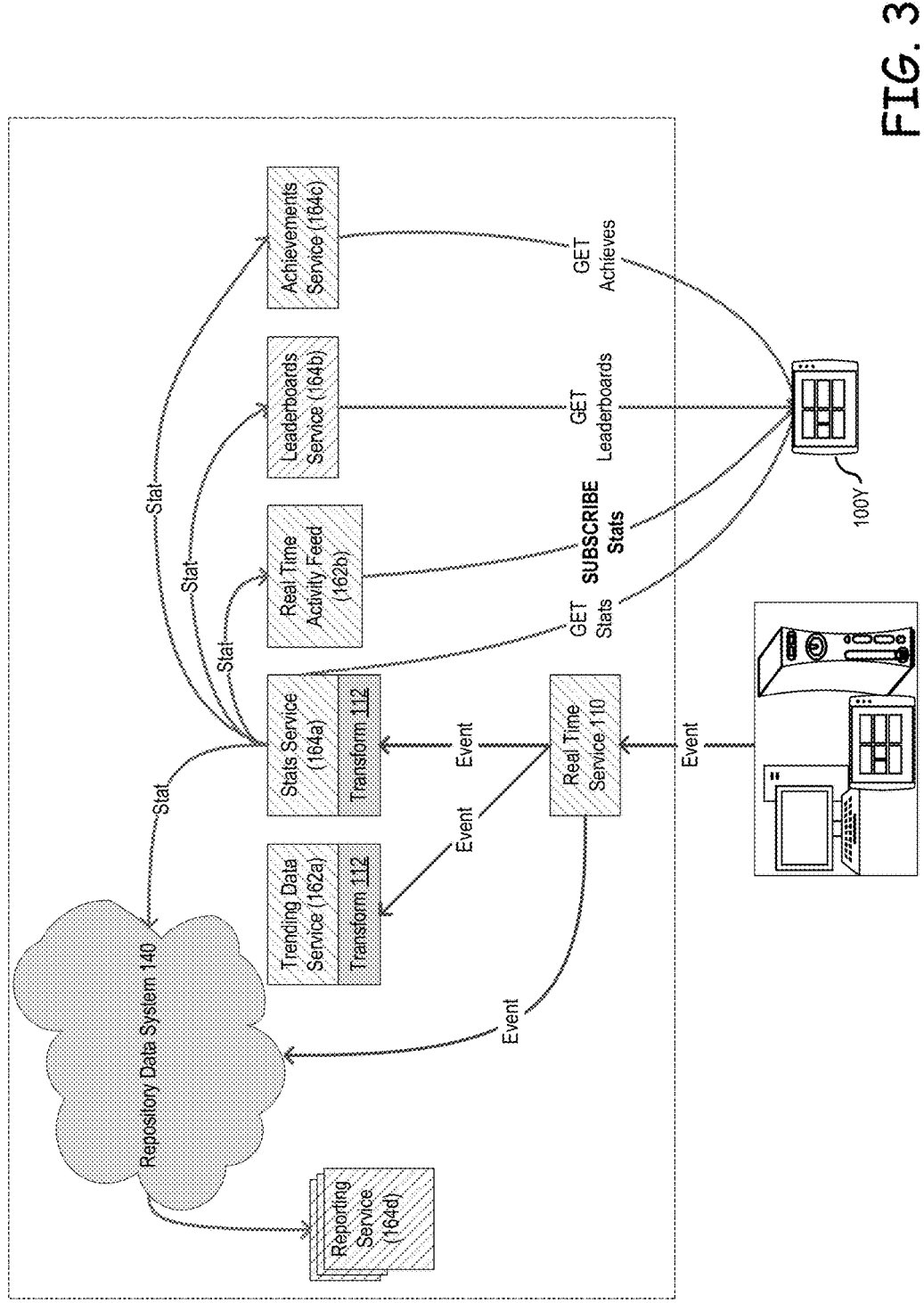
FIG. 3 is a block diagram illustrating a more detailed depiction of data flow in accordance with the present technology.

FIG. 3 is a more detailed dataflow diagram illustrating data flow with respect to exemplary services provided by the real time data system and the repository data system. As illustrated in FIG. 3, as event is generated by processing devices 100, the real-time event system 110 provides the event to the transformer 117 which create statistics used to feed any number of different other activity feeds and services. These may include, for example, a trending data service 162*a*, a statistics service 164*a*, a real-time activity feed 162*b*, a leaderboard service 164*b*, and achievement service 164*c*. It should be recognized that the services illustrated in FIG. 3 are exemplary, and any number of different services and data feeds may be utilized in accordance with the present technology. The statistics can be retrieved by another processing device, 100Y, though get calls or subscriptions to the respective services. The repository data system outputs additional reporting information 164*d* can be used by the third-party secondary application developers 180 or the primary application developers 170.

Figure 4:
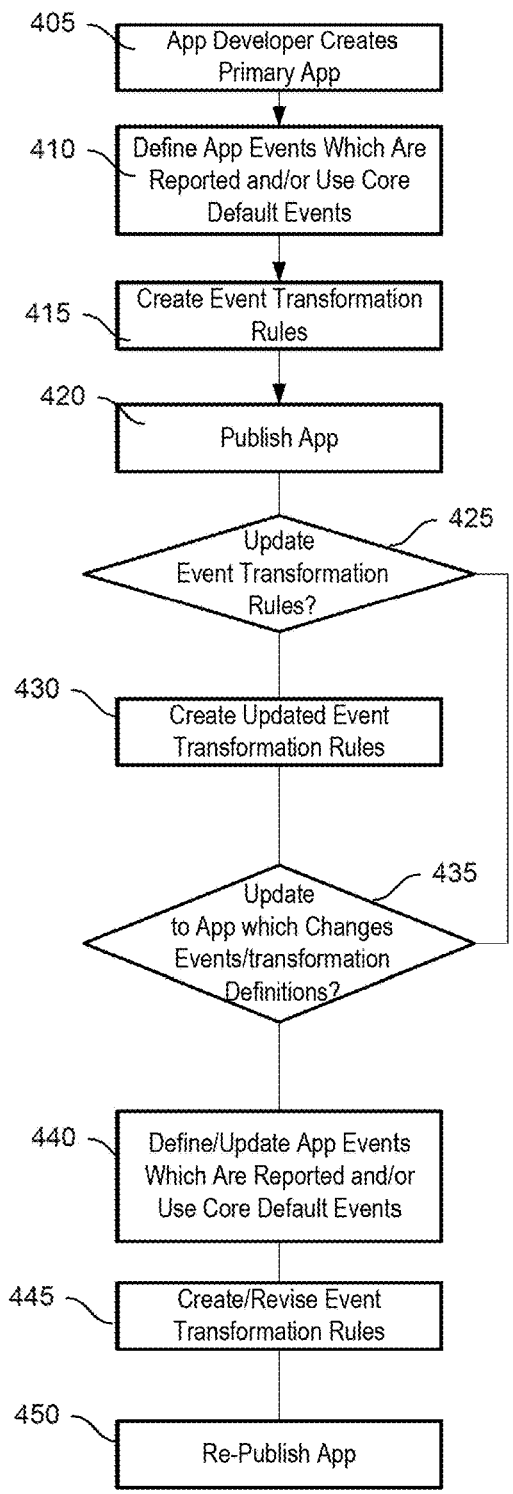
FIG. 4 is a flowchart illustrating a method performed by a primary application developer in accordance with the present technology.

FIG. 4 is a flowchart illustrating a process which may be performed by a primary application developer 170 in creating an application for use in accordance with the system described herein. At step 405, primary application developer 170 may develop primary application such as a game. At 410, game events which are to be reported to the service 102 are defined using a common schema that predefines certain fields that every event contains. Exemplary fields include the date/time of the event, the type of device that generated the event, and the like. An event consists of a set of fields. Each field has a data type (number, string of text, custom list of items, etc.). Some fields may consist of a custom list of items and that list can optionally be defined as part of the system or could be treated as an opaque number that is not understood or interpreted by the system. The schema includes language for describing the mechanism whereby an event is transformed into a set of values/counters. An EnemyKilled event might contain the following fields: WeaponType, EnemyType, and MapId. A WeaponType field might consist of values that represent three different types of weapons: AssaultRifle, Pistol, Shotgun. Similar lists might exist for EnemyType and MapId. These values may or may not be understood by the multiuser service 102.

Once events which are to be reported are defined at 410, event transformation rules may be created at 415. Using the above examples, the transformation rules could say that the following statistics/counters should be created: Kills.WithWeapon.{WeaponId}, Kills.OnMap.{MapId}, etc. The actual values from each event would be substituted for the identifiers in braces and would seamlessly pick up new MapId, EnemyType, values as well as other field values.

At 420, the primary application developer may publish the application to users who run the application on a processing device as previously described.

At a later time, and optionally, at 425 the primary application developer may choose to update the event transformation rules. Also optionally, and/or at 435, the primary application developer may choose to update the application and change events or event definitions or statistics which are to be reported by the multiuser service 102. In accordance with the technology, the application developer can do so without disturbing the underlying structure of the game. Since event definitions and transformation rules could be updated at any time, additional statistics and counters can be created from existing events, even after the original application has shipped. For example, perhaps the primary application developer would like to track the number of kills of a specific enemy on each map: Kills.OnMap.{MapId}.OfEnemy.{EnemyType}. This may be provided in an updated set of events or transformation definitions at 425 without updating the published application. If the primary application developer chooses to update the transformation rules, then at 430 updated rule and/or transformations may be created at 430. Alternatively or in addition, when an application update is preformed at 435, new or updated events may be defined in the primary application at 440, new or revised event transformation rules may be updated or created at 445 and a new/revised version fo the application published at 450. Steps 425-430 and 435-450 may be repeated as desired by the application developer. In alternative embodiments, steps 425 and 430 may be performed by a third party as under the direction of or with the permission of by the application developer.

Figure 5:
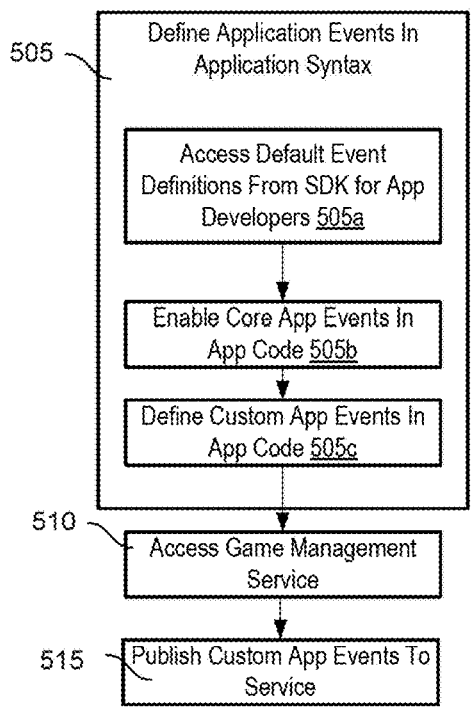
FIG. 5 is a flowchart illustrating one method for defining events in accordance with the method of FIG. 4.

FIG. 5 is a flowchart illustrating one embodiment of step 410 in FIG. 4. At 505, a primary application developer defines application events in the management system syntax described above. Defining application events may be performed by one or more of: utilizing a software development kit at 505a which provides an interface allowing developers to input variables and generates source code for developers to use directly in their applications; directly authoring core application events in the application code at 505b; and/or defining custom application events in application code at 505c. At 510, the game management service is accessed to deliver the application event definitions to the game management service. Step 510 may be performed using a the application programming interface 138 or through a separately provided interface allowing the developer to communicate definitions directly axis default event definitions from, for example, the software development kit. Alternatively, the game management service 102 may be provided via application interface such as a web browser interface or other programmatic interface allowing primary application developers to define events and event definitions for their particular application. At step 515, application events will be published to the game service 102.

Figure 6:
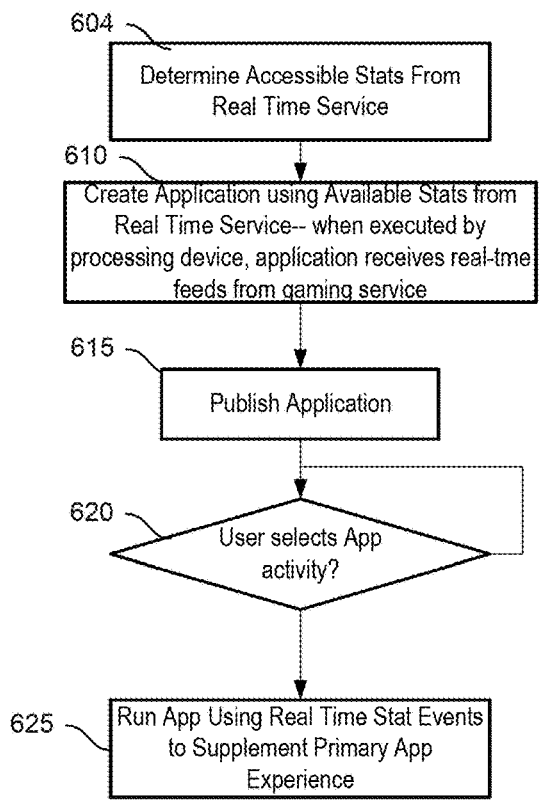
FIG. 6 illustrates a method performed by a secondary application developer in accordance with the present technology.

FIG. 6 illustrates a method performed by secondary application developer 170 to create a secondary application for use with the primary application and multiuser service 102. At 604, the secondary application developer will determine accessible stats from of the real-time game management service 102. The service 102 may publish any one or more available services and feeds which may be used by the secondary application developer in their applications. At 610, the secondary application developer will create a secondary application using available statistics and other information which may be provided by the real-time service 102. When executed by a processing device 100, the application will utilized the real-time statistics provided by the service 102 and in the experience provided by the secondary application. At 615, the application is published for use by users on processing devices. At a later time, and optionally, at 620, if a secondary developer chooses to modify the secondary application, then at 625 the secondary application may be modified by repeating steps 604 and 610. If the primary application developer or the service 102 has modified the services or statistics available, such modifications may (or may not) be incorporated by the secondary application developer. In either case, the secondary developer's activities are decoupled from any direct interaction with the development of the primary application.

FIG. 7 illustrates a flowchart of a method which may be performed by an administrator of the multiuser service 102 in order to allow primary and secondary application developers to utilize the service 102 in accordance with the technology. At 702, the administrator may provide core event definitions primary application which are utilized and managed by service 102. The core definitions are those which the service 102 may provide at a basic level to secondary application developers. Step 702 is optional and in one embodiment, no core events are provided. Optionally, at step 704, a software development toolkit which may be provided. The toolkit allows primary application developers to, amongst other things, create custom events or select from a catalog of events vents which can be utilized by application developers in a standard format within their game code. In addition, an optional toolchain for converting an event definition into a piece of code that makes it easier to trigger that event from a host application may be provided. At 706, a default event catalog may be provided. This can include an optional catalog of generic events, application-type specific events (game, entertainment app, etc.), and genre-specific events (first person shooter game, puzzle game, etc.) that can be used to speed the development of a primary application's custom event catalog. Application developers can start with the events in this catalog and modify them for use in their application. At 708, default event services may be provided. These can include statistic services, leaderboard services, trending data services and the like, as previously described. At 710, the real time data system in accordance with the discussion herein may be enabled. At 712, the repository data system may be enabled. In one embodiment, a repository data system need not be used.

FIG. 8 illustrates a method performed by the real-time event service when a new game or updated game is operating with the service 102. At 802, the application is registered with the application service 102. At 804, custom primary application event definitions are received. Custom primary application event definitions may be provided by the primary application developer, in accordance with various embodiments of the present technology. In one embodiment, no custom event definitions are used. In another embodiment, the primary application developer may define custom event definitions. At 806, custom statistic definitions may be received. It should be recognized that steps 804 and 806 are optional, and are dependent upon the primary application developers desires with respect to the primary application under development. At step 808, primary application events are received by the game management service 102 from processing devices 100 running primary applications. Primary application events may be provided by the client directly, by the library illustrated in FIG. 1, or by an intermediary service to the real-time event system 110 and repository data service 140. At 810, application events are transformed into statistics for use by secondary application developers and at step 814, the stats are output to one or more various output services. Optionally at 814, events may be filtered for various output services to which they are provided. This filtering at 812 may including aggregating events in order to improve the efficiency of the system. For example, three back-to-back events with identical fields could be collapsed into a single event if the intermediate values of the fields need not be kept.

FIG. 9 illustrates a method performed by the repository data service 140 in accordance with one embodiment of the technology. At 902, custom primary application event definitions are received. At step 904, custom transformation definitions are received. At 906, primary application events are received. It should be understood that the receipt of custom primary application event definitions at 902, and custom statistic definitions at 904 may be in the same manner as though set forth in FIG. 8. At 906, primary application events are received from the processing devices.

In one aspect, events are received from the devices (or the library); in another embodiment, real-time event system 110 provides events to the repository data service. At 906, the events are stored in persistent storage for use in checking the accuracy of various services provided by the service 102. At 908, events received may be transformed and stored separately from the stats and services provided by the real-time event system 110. At 910, one or more crosschecks may occur to ensure that the stats output by the real-time application service are in agreement with those calculated by the repository data service, if not, the real-time system can be updated at 914. At 912, core service stats may be crosschecked against achievements which have been provided to users. If the repository service and the real time service do not agree, the real-time system can be updated. Alternatively, game devices may be updated directly at 916 from the output of either the checks at 910 or 912.

In another embodiment, the transformation step 908—services or secondary developers may consume the events directly without any modifications having been made by the game service. The game service may still route events in order to keep primary and secondary applications decoupled. In a still further embodiment, a user device may route primary application events directly to the secondary application using a client-side code or API.

Figure 10:
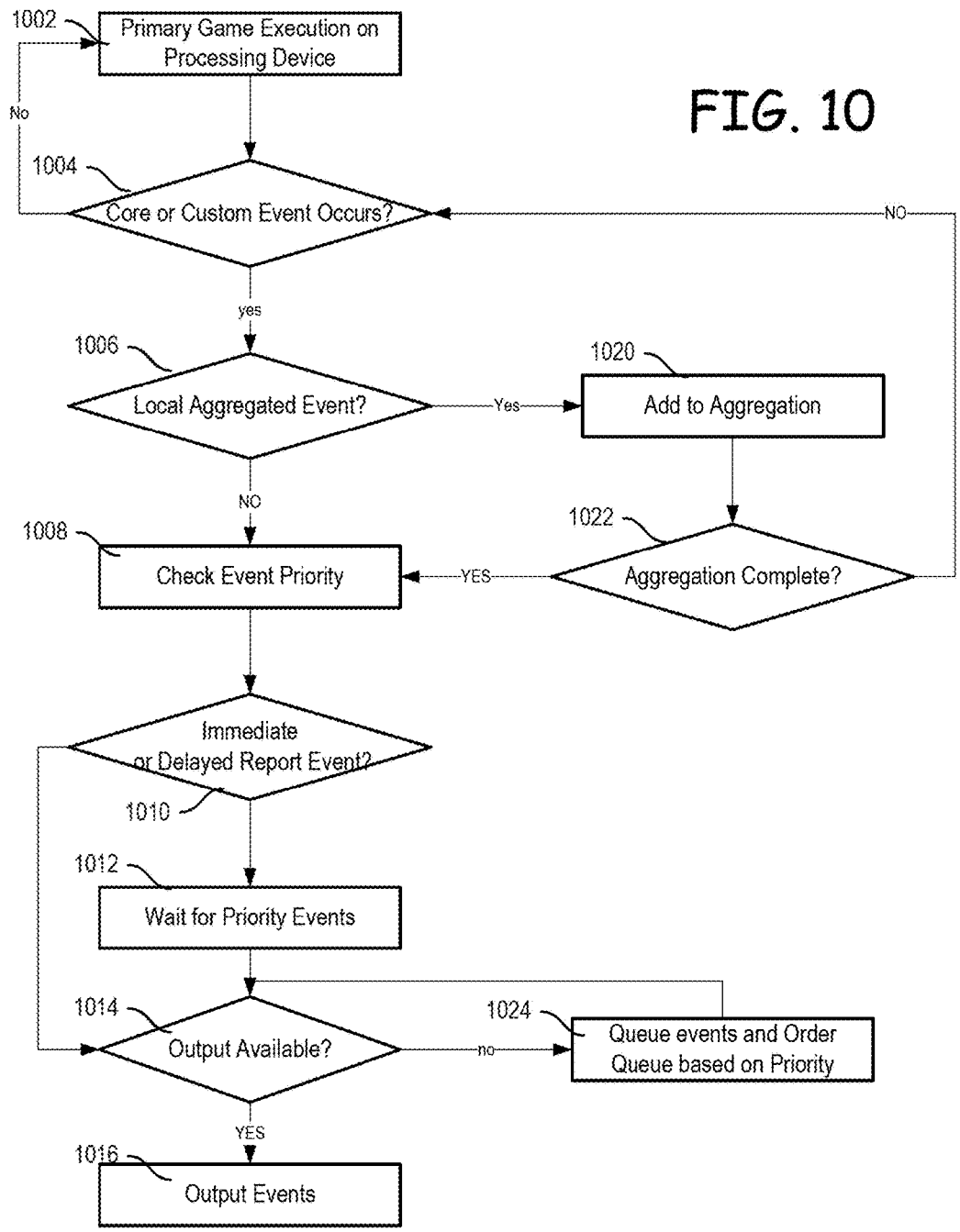
FIG. 10 is a flowchart illustrating a method performed by a user processing device to publish methods during execution of an application on the device.

FIG. 10 is a method illustrating the aggregation which may occur on processing devices 100 were such aggregation is provided in the client devices for example, by library 116. As noted herein, the aggregation may be provided by a library 116 operating on the client device in conjunction with the operating system, or may be provided and executed with each game which is utilizing application service 102. At step 1002, the primary application is executed on the processing device and generates events. At step 1004, a determination is made as to whether or not core or custom event has occurred. If not, game execution continues at 1002. If a core or custom event has occurred, a determination is made at 1006 as to whether or not the event should be locally aggregated on the processing device. Local aggregation helps with efficiency in terms of transmission to the service 102. Network transmissions require resources on the processing devices, and can take up bandwidth which is otherwise be utilized for application performance. Local aggregation of events can reduce the amount of transmission which would be utilized to transmit all the events to a service 102. If the event is a locally aggregated event at 1006, then at 1020, the event is added to the aggregation set and a determination is made at step 1022 as to whether or not the aggregation is complete. If not, the method returns to wait for the next event. At step 1008, if the event is not a local aggregation event, or if aggregation at 1022 is complete then an event priority may be determined. Event priority allows sending higher priority events and aggregations before lower priority ones. This can be useful in situations where bandwidth is limited, or a processing device has been decoupled from the network or is otherwise unable to communicate with the service 102. A determination is made at 1010 as to whether or not an immediate or delayed reporting of the event should be utilized. If the event should be transmitted immediately, then a determination is made at 1014 is whether or not the output is available. If the event is allowed to be delayed, then at 1012, events are held while priority events are transmitted to the output at 1014. If the output is not available, then the events queued in the order based on priority until bandwidth is sufficiently available to provide events to an output. Once the output is available, all events are output at 1016 to the appropriate service.

Figure 11:
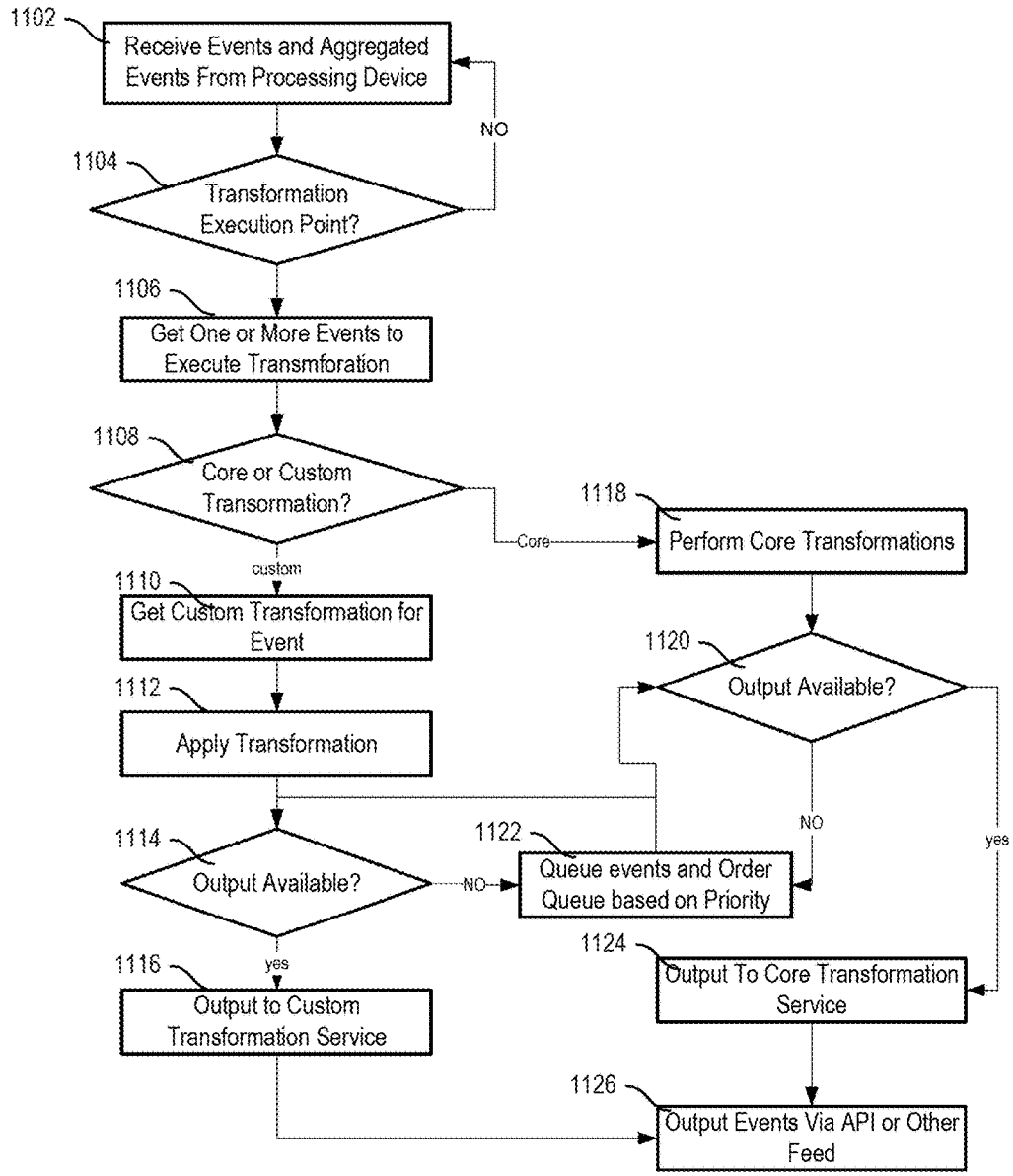
FIG. 11 is a flowchart illustrating transformation of events into statistics by an application service provider.

FIG. 11 is a method illustrating transformation of events transmitted to the service into statistics for use by services and feeds in accordance with the foregoing discussion. FIG. 11 illustrates one method of performing step 810 in FIG. 8. This transformation may occur either the real-time event system or the repository data system. At 1102, events and aggregated events for the processing device are received. At 1104, determination is made as to whether or not a transformation execution point has occurred. A transformation execution point can be determined based on any number of factors including, but not limited to, the rules defined for the transformation event. Certain transformation events comprise exceeding a particular number of events received, or calculating an aggregated value over a threshold. As such, transformation execution point may not occur until sufficient number of events have been received or a value in the events is sufficient to trigger the calculation of a new output for a statistic. Other events may be simply counters adding to a specific statistic from which one or more events serve as a basis. Still other transformations may occur on receipt of every event of a certain type. At 1106, if a transformation execution point has been reached, then one or more events to execute transformation rule are received. Statistics may be derived from multiple events having different types of data therein. A example of a transformation is a count of the number of times that each user has triggered an event. A more complex example would be to update a user's value if the new value is smaller or larger than a previous value. In accordance with steps 1102 and 1104, each event that is triggered and received from a processing device 100 is evaluated against a relevant list of transformation rules and all of the transformations should be applied. At 1108, determination is made as to whether or not the event transformation is a core transformation or custom transformation. If the transmission is a core transformation at 1118, core transformation is performed by retrieving the core transformation rules provided by the administrator. If the event is a custom transformation, that 1110, custom transformation rules supplied by the application developer or secondary application developers retrieved at 1110 and at 1112, custom transformations are applied.

As noted above, the core and custom transformations may bear a relationship to the primary application (for example, number of achievements by all users of the application across all processing devices), a relationship to individual users (for example, the number of achievements by the user across all primary applications) or other relationships. As such, both events and statistics can have a relationship to one or more characteristics of users, processing devices, primary applications, secondary applications, primary developers, secondary developers and other characteristics.

Once all transformations are completed, a determination is made at 1114 or 1120 as to whether or not an output is available. If an output is not available, events are queued at 1122 and ordered based on the priority statistics to be output. If an output is available at 1114, then the output of the stats is provided to custom transformation services at 1116. Similarly, if an output is available at 1120, the statistics are output to the transformation service at 1124. At 1126, all statistics may be output via the application programming interface or other service.

Figure 12:
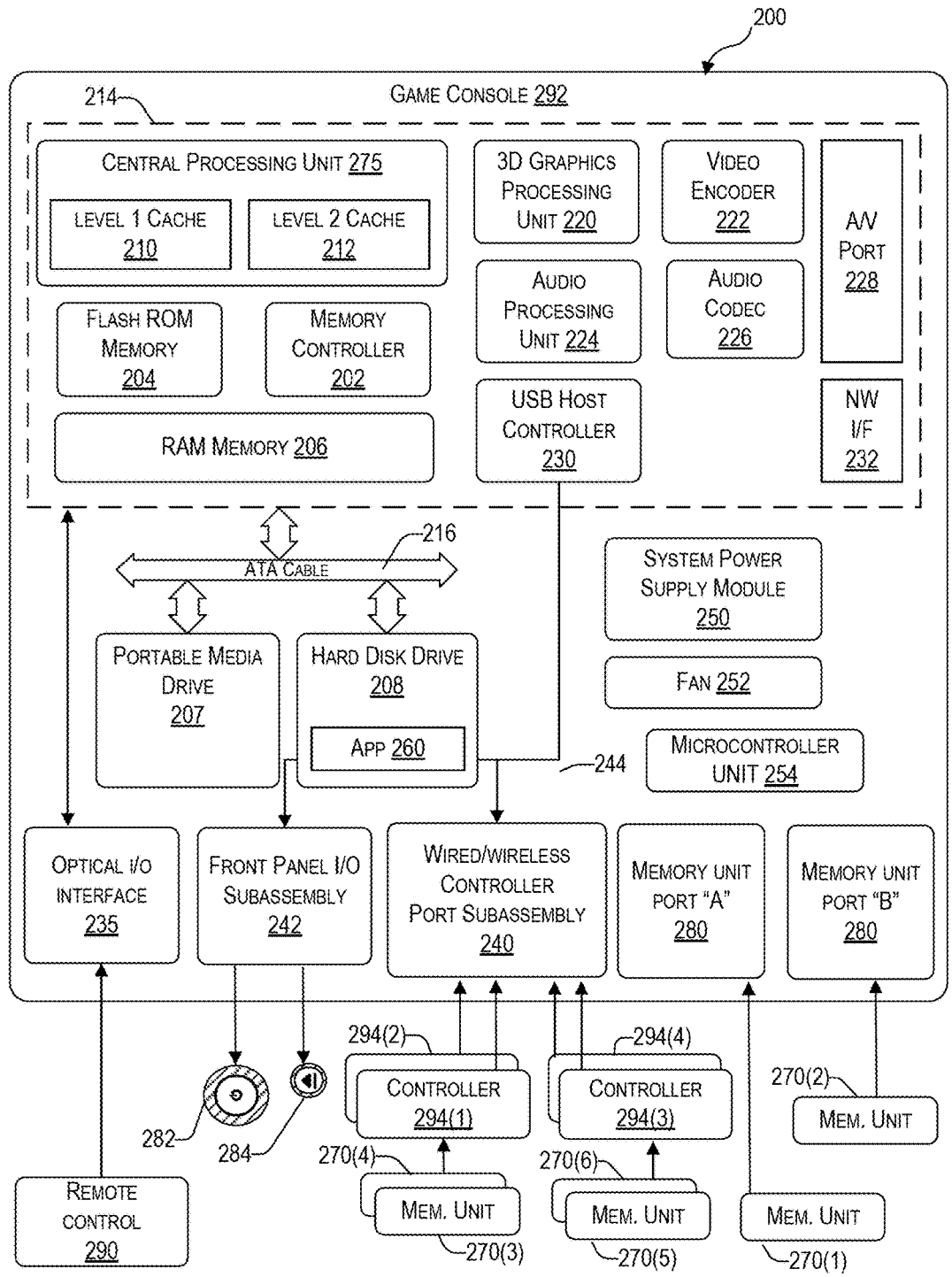
FIG. 12 is a block diagram of a first processing device suitable for implementing the present technology.

FIG. 12 is a functional block diagram of the gaming and media system 200 and shows functional components of the gaming and media system 200 in more detail. Console 292 has a central processing unit (CPU) 275, and a memory controller 202 that facilitates processor access to various types of memory, including a flash Read Only Memory (ROM) 204, a Random Access Memory (RAM) 206, a hard disk drive 208, and portable media drive 207. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 12 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 12, console 292 includes a controller support subassembly 240 for supporting four controllers 294(1)-294(4). The controller support subassembly 240 includes any hardware and software components needed to support wired and wireless operation with an external control device, such as for example, a media and game controller. A front panel I/O subassembly 242 supports the multiple functionalities of power button 282, the eject button 284, as well as any LEDs (light emitting diodes) or other indicators exposed on the outer surface of console 292. Subassemblies 240 and 242 are in communication with module 214 via one or more cable assemblies 244. In other implementations, console 292 can include additional controller subassemblies. The illustrated implementation also shows an optical I/O interface 235 that is configured to send and receive signals that can be communicated to module 214.

MUs 270(1) and 270(2) are illustrated as being connectable to MU ports "A" 280(1) and "B" 280(2) respectively. Additional MUs (e.g., MUs 270(3)-270(6)) are illustrated as being connectable to controllers 294(1) and 294(3), i.e., two MUs for each controller. Controllers 294(2) and 294(4) can also be configured to receive MUs (not shown). Each MU 270 offers additional storage on which games, game parameters, and other data may be stored. In some implementations, the other data can include any of a digital game component, an executable gaming application, an instruction set for expanding a gaming application, and a media file. When inserted into console 292 or a controller, MU 270 can be accessed by memory controller 202. A system power supply module 250 provides power to the components of media system 200. A fan 252 cools the circuitry within console 292.

An application 260 comprising machine instructions is stored on hard disk drive 208. When console 292 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 200 may be operated as a standalone system by simply connecting the system to a monitor, a television, a video projector, or other display device. In this standalone mode, gaming and media system 200 enables one or more players to play games, or enjoy digital media, e.g., by watching movies, or listening to music. However, with the integration of broadband connectivity made available through network interface 232, gaming and media system 200 may further be operated as a participant in a larger network gaming community, as discussed in connection with FIG. 1.

Figure 13:
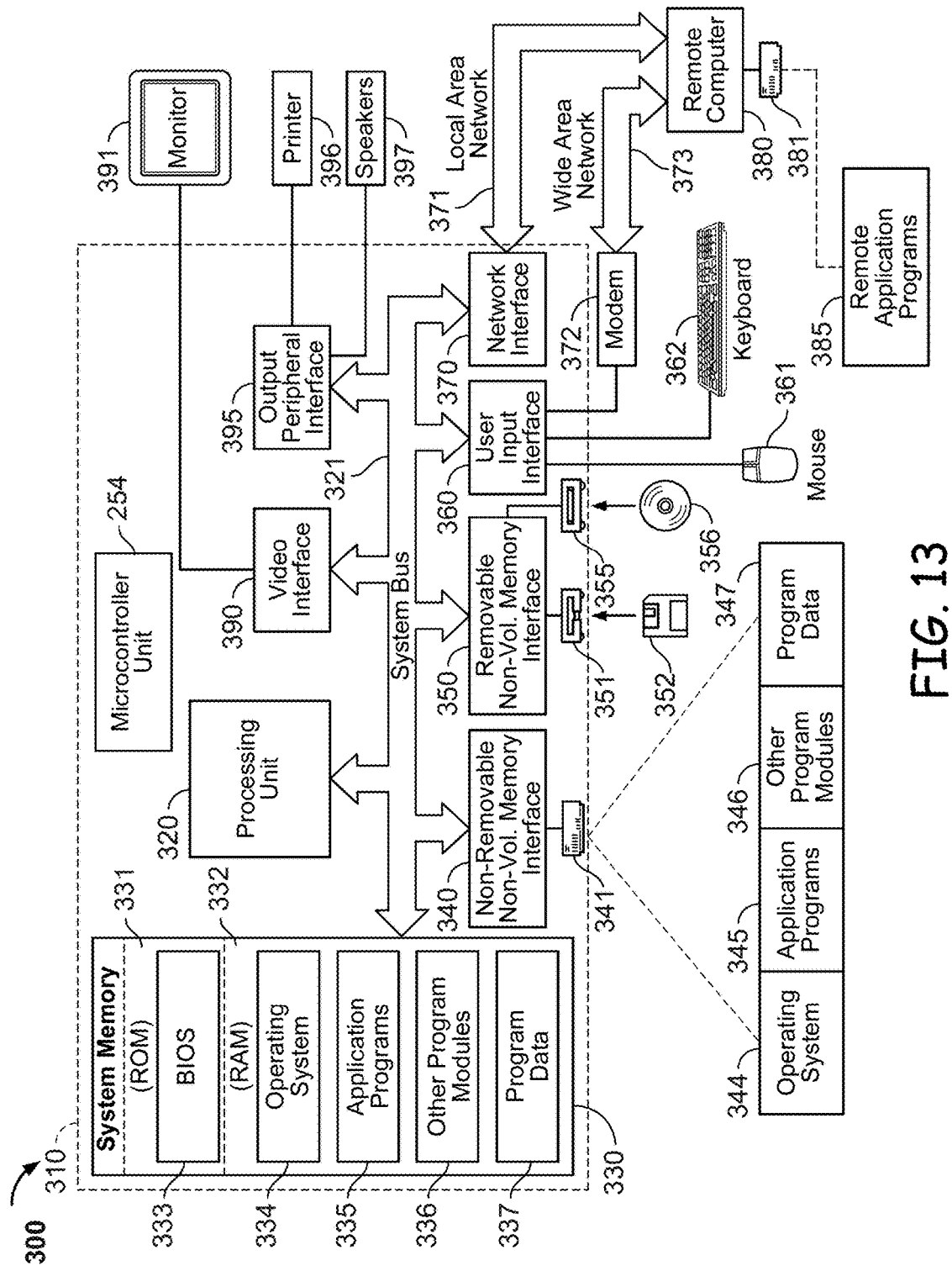
FIG. 13 is a block diagram of a second type processing device suitable for performing the present technology.

FIG. 13 illustrates a general purpose computing device for implementing the operations of the disclosed technology. With reference to FIG. 13, an exemplary system for implementing embodiments of the disclosed technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 13 illustrates operating system 334, application programs 335, other program modules 336, and program data 337.

The computer 310 may also include other removable/non-removable, volatile/nonvolatile computer storage media. By way of example, FIG. 13 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

Figure 14:
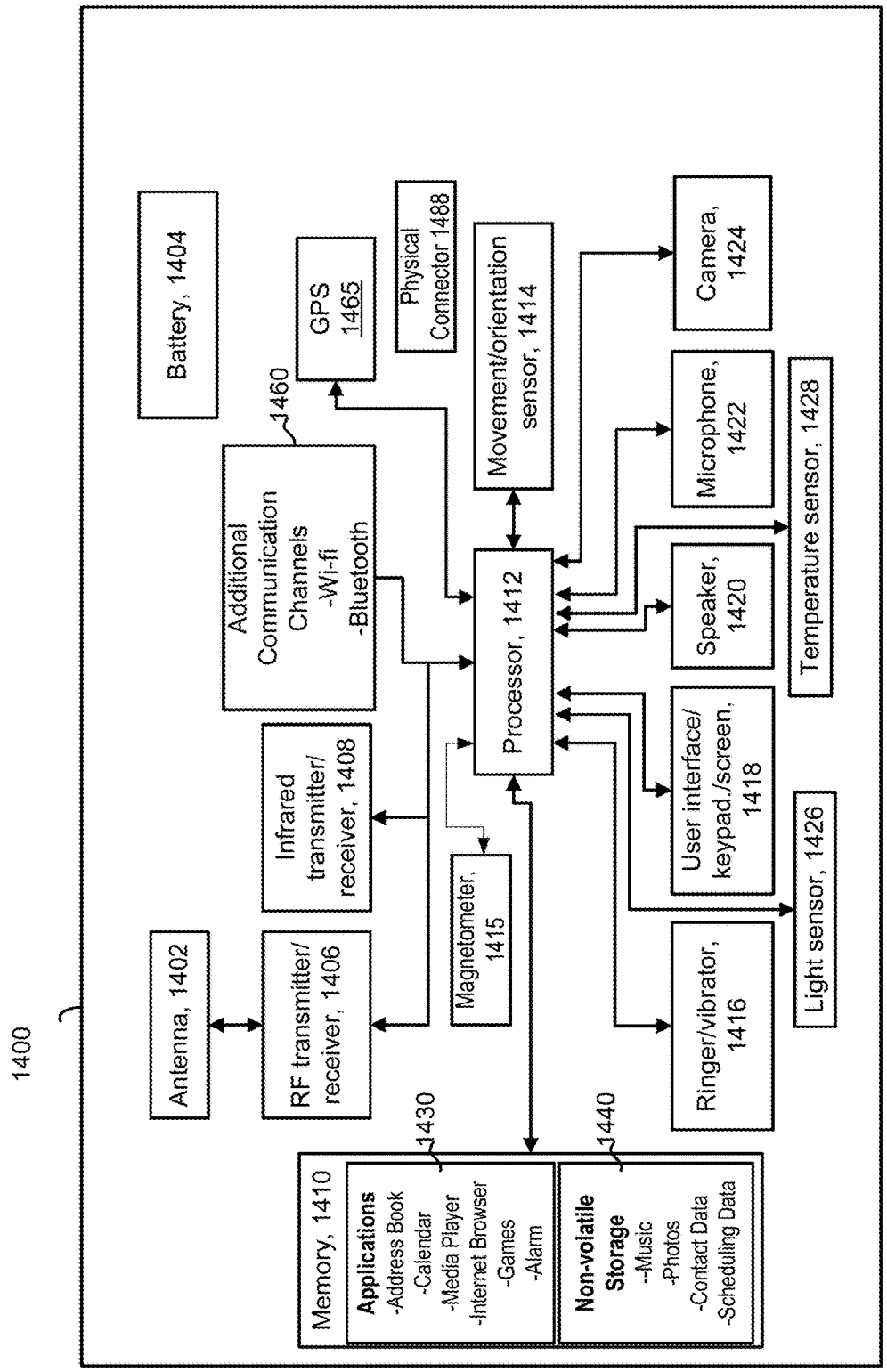
FIG. 14 is a block diagram of the third type processing seemed device suitable for implementing the present technology.

The drives and their associated computer storage media (or computer storage medium) discussed herein and illustrated in FIGS. 12-14, provide storage of computer readable instructions, data structures, program modules and other data for the computer 310. In FIG. 13, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 13. The logical connections depicted in FIG. 13 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 13 illustrates remote application programs 385 as residing on memory device 381. It will be appreciated that the network connections shown are exemplary and other means of establishing a communications link between the computers may be used.

FIG. 14 depicts an example block diagram of a mobile device for implementing the operations of the disclosed technology. Exemplary electronic circuitry of a typical mobile phone is depicted. The mobile device 1400 includes one or more microprocessors 1412, and memory 1410 (e.g., non-volatile memory such as ROM and volatile memory such as RAM) which stores processor-readable code which is executed by one or more processors of the control processor 1412 to implement the functionality described herein.

Mobile device 1400 may include, for example, processors 1412, memory 1410 including applications and non-volatile storage. The processor 1412 can implement communications, as well any number of applications, including the applications discussed herein. Memory 1410 can be any variety of memory storage media types, including non-volatile and volatile memory. A device operating system handles the different operations of the mobile device 1400 and may contain user interfaces for operations, such as placing and receiving phone calls, text messaging, checking voicemail, and the like. The applications 1430 can be any assortment of programs, such as a camera application for photos and/or videos, an address book, a calendar application, a media player, an internet browser, games, an alarm application or other third party applications. The non-volatile storage component 1440 in memory 1410 contains data such as web caches, music, photos, contact data, scheduling data, and other files.

The processor 1412 also communicates with RF transmit/receive circuitry 1406 which in turn is coupled to an antenna 1402, with an infrared transmitted/receiver 1408, and with a movement/orientation sensor 1414 such as an accelerometer and a magnetometer 1415. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1412 further communicates with a ringer/vibrator 1416, a user interface keypad/screen 1418, a speaker 1420, a microphone 1422, a camera 1424, a light sensor 1426 and a temperature sensor 1428. Magnetometers have been incorporated into mobile devices to enable such applications as a digital compass that measure the direction and magnitude of a magnetic field in the vicinity of the mobile device, track changes to the magnetic field and display the direction of the magnetic field to users.

The processor 1412 controls transmission and reception of wireless signals. During a transmission mode, the processor 1412 provides a voice signal from microphone 1422, or other data signal, to the transmit/receive circuitry 1406. The transmit/receive circuitry 1406 transmits the signal to a remote station (e.g., a fixed station, operator, other cellular phones, etc.) for communication through the antenna 1402. The ringer/vibrator 1416 is used to signal an incoming call, text message, calendar reminder, alarm clock reminder, or other notification to the user. During a receiving mode, the transmit/receive circuitry 1406 receives a voice or other data signal from a remote station through the antenna 1402. A received voice signal is provided to the speaker 1420 while other received data signals are also processed appropriately.

Additionally, a physical connector 1488 can be used to connect the mobile device 100 to an external power source, such as an AC adapter or powered docking station. The physical connector 1488 can also be used as a data connection to a computing device. The data connection allows for operations such as synchronizing mobile device data with the computing data on another device. A global positioning service (GPS) receiver 1465 utilizing satellite-based radio navigation to relay the position of the user applications is enabled for such service.

As noted above, one implementation of this technology includes a library used by applications in order to trigger events and push them into the transformation flow. Service 102 includes a client-server API i to accept streams of events from applications and ingest them into a cloud-based transformation pipeline managed by service 102. The service 102 accepts incoming events and applies transformations and aggregations to provide statistics. The statistics are then stored in a datastore and values are also forwarded to other services.

The repository data service 140 creates a historical archive that can be queried and used to generate reports showing events/values over time. The multiuser service 102 exposes APIs that allow calculated values to be retrieved by other internal and external clients and services. The real-time event system 110 takes a calculated value feed and allows clients and services to subscribe to change notifications of those values.

In an alternative implementation, rather than using local event transformation may be utilized. Local transformation may be full or partial. Rather than all events generated on processing devices being pushed to game management service 102, one or more transformation components may run on a processing device 100 and distribute events and statistics to other processing devices 100. No communication need take place with a host multiuser service 102 directly to clients; no communication takes place with a hosted service. These embodiment significantly decreases the latency of event and statistic distribution since it may take place over a local network or wireless connection.

The two implementations above could even be present at the same time and serve different companion applications at the same time (some of which are connected to the host application, others which are analyzing the historical store, and another group which are subscribed to real-time changes to the calculated values).

In yet another embodiment, event definitions need not be provided by application developers or the service 102. In such case, each event may be self-describing. Transformation rules would look at the structure of each event and apply their rules using a pattern-based approach.

The technology allows firing a high-level set of events with minimal effort on the part of the primary application developer and shifts the burden of extensibility, onto the transformation system that is described by this technology. This decoupling also provides an integration point for third parties: the output of the transformation system could be made available to other developers and those developers could build experiences on top of the host application without the involvement of the developers of the host application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving a plurality of events generated by one or more of a plurality of primary applications executing on a processing device of a plurality of processing devices, the plurality of primary applications written by one or more primary application developers in a first programming language comprising an application code, the plurality of events occurring in execution of, and generated by, the one or more of the plurality of primary applications, the plurality of events comprising custom events designed by the one or more primary application developers specifically for use in one or more secondary applications based on the one or more primary applications, the one or more secondary applications written by one or more secondary application developers that are different from the primary application developers, wherein the receiving of the plurality of events includes receiving in a prioritization order according to an event priority associated with each of the plurality of events by each of the plurality of processing devices;

defining a set of transformation rules, wherein the transformation rules comprise core transformation rules provided by an administrator of a multiuser service and custom transformation rules provided by the primary application developers;

transforming, by the multiuser service accessible by the one or more secondary application developers, the plurality of events into a plurality of statistics according to the set of transformation rules, the plurality of statistics representing information about the execution of the primary applications across the plurality of processing devices; and publishing the plurality of statistics and at least a portion of the plurality of events including the custom events to the one or more of the secondary application developers, wherein published ones of the plurality of statistics and at least the portion of the plurality of events are configured for use by the secondary application developers to create the one or more secondary applications to provide information to supplement a user experience with the plurality of primary applications.

2. The method of claim 1, wherein the plurality of events are described in a standard event syntax that is standardized across the plurality of primary applications, and further including receiving definitions for at least the portion of the plurality of events in the standard event syntax.

3. The method of claim 1, further including receiving event definitions from at least a portion of the one or more of the plurality of primary application developers.

4. The method of claim 1, wherein the publishing includes providing the plurality of statistics and at least the portion of the plurality of events to a service accessible by the one or more secondary applications.

5. The method of claim 1, further including storing the plurality of events and the plurality of statistics in a data store and re-calculating the plurality of statistics.

6. The method of claim 1, wherein publishing the plurality of statistics and at least the portion of the plurality of events includes publishing from the processing device to a second processing device, the second processing device including at least one of the one or more secondary applications configured to consume the published ones of the plurality of statistics and at least the portion of the plurality of events.

7. A method of providing a computer implemented service, comprising:

providing a data syntax allowing primary application developers to encode events generated by execution of different primary applications operating on a plurality of processing devices in a common format such that a first primary application developed by a first primary application developer includes a first set of events encoded in the data syntax and a second primary application developed by a second primary application developer, different than the first primary application developer, includes a second set of events encoded in the data syntax, the data syntax being different than an application code in which the different primary applications, including the first and second primary applications, are written;

operating a data service on a processing device receiving a plurality of the events in the data syntax from a plurality of different applications created by different primary application developers, wherein the receiving of the plurality of events includes receiving in a prioritization order according to an event priority associated with each of the plurality of events by each of the plurality of processing devices;

defining a set of transformation rules, wherein the transformation rules comprise core transformation rules provided by an administrator of a multiuser service and custom transformation rules provided by the primary application developers;

transforming, by the multiuser service accessible by one or more secondary application developers, the plurality of events into a plurality of statistics according to the set of transformation rules, the plurality of statistics representing information about the execution of the different primary applications across the plurality of processing devices; and publishing the plurality of statistics and at least a portion of the plurality of events to the one or more of the secondary application developers, wherein published ones of the plurality of statistics and at least the portion of the plurality of events are configured for use by the secondary application developers to create the one or more secondary applications to provide information to supplement a user experience with the different primary applications.

8. The method of claim 7, further including receiving event definitions from at least a portion of the primary application developers.

9. The method of claim 7, wherein at least a portion of the plurality of events received are aggregated prior to the receiving of the plurality of events at the processing device.

10. A method, comprising:

receiving a plurality of events generated by one or more of a plurality of primary applications executing on a processing device of a plurality of processing devices, the plurality of primary applications written by one or more primary application developers, the plurality of events occurring in execution of, and generated by, the one or more of the plurality of primary applications for use in one or more secondary applications based on the one or more primary applications, the one or more secondary applications written by one or more secondary application developers different than the primary application developers, wherein the receiving of the plurality of events includes receiving in a prioritization order according to an event priority associated with each of the plurality of events by each of the plurality of processing devices;

defining a set of transformation rules that transform the plurality of events into a plurality of statistics relating to the one or more primary applications, wherein the transformation rules comprise core transformation rules provided by an administrator of a multiuser service and custom transformation rules provided by the primary application developers;

transforming the plurality of events, by the multiuser service accessible by the one or more secondary application developers, into the plurality of statistics relating to the one or more primary applications using the set of transformation rules, the statistics representing information about the execution of the one or more primary applications across the plurality of processing devices; and publishing the plurality of statistics and at least a portion of the plurality of events to the one or more of the secondary application developers, wherein published ones of the plurality of statistics and at least the portion of the plurality of events are configured for consumption by the secondary application developers to create the one or more secondary applications to provide information to supplement a user experience with the plurality of primary applications.

* * * * *